United States Patent
Nielsen et al.

(10) Patent No.: US 10,298,140 B2
(45) Date of Patent: May 21, 2019

(54) WIND TURBINE CONVERTER CONTROL

(71) Applicant: VESTAS WIND SYSTEMS A/S, Aarhus N (DK)

(72) Inventors: John Godsk Nielsen, Hornslet (DK); Søren Andersen, Tilst (DK); Lars Helle, Suldrup (DK); Duy Duc Doan, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 20 days.

(21) Appl. No.: 15/564,847

(22) PCT Filed: Apr. 11, 2016

(86) PCT No.: PCT/DK2016/050102
§ 371 (c)(1),
(2) Date: Oct. 6, 2017

(87) PCT Pub. No.: WO2016/165719
PCT Pub. Date: Oct. 20, 2016

(65) Prior Publication Data
US 2018/0123470 A1    May 3, 2018

(30) Foreign Application Priority Data
Apr. 16, 2015 (DK) ................. 2015 70222

(51) Int. Cl.
*H02M 5/458* (2006.01)
*H02P 27/00* (2006.01)
(Continued)

(52) U.S. Cl.
CPC .......... *H02M 5/4585* (2013.01); *F03D 9/255* (2017.02); *H02J 3/386* (2013.01); *H02M 7/493* (2013.01);
(Continued)

(58) Field of Classification Search
CPC ............ H02M 1/08; H02M 1/12; H02M 1/14; H02M 1/42; H02M 2001/0009;
(Continued)

(56) References Cited

U.S. PATENT DOCUMENTS

| | | | |
|---|---|---|---|
| 8,692,408 B2 * | 4/2014 | Zhang | H02M 5/458 |
| | | | 307/12 |
| 8,823,190 B2 * | 9/2014 | Wang | H02P 9/007 |
| | | | 290/44 |

(Continued)

FOREIGN PATENT DOCUMENTS

| | | |
|---|---|---|
| EP | 0913918 A2 | 5/1999 |
| EP | 2830210 A2 | 1/2015 |

(Continued)

OTHER PUBLICATIONS

Danish Search Report for Application No. PA 2015 70222, dated Nov. 19, 2015.
(Continued)

*Primary Examiner* — Fred E Finch, III
*Assistant Examiner* — Demetries A Gibson
(74) *Attorney, Agent, or Firm* — Patterson + Sheridan, LLP

(57) ABSTRACT

A method of controlling a full-scale converter system in which both the grid-side inverter unit and the generator-side inverter unit have a series-connection of parallel inverters and form a generator-side and grid-side voltage-center-point at a voltage level between the inverters connected in series. The voltage-center-points are electrically connected by a center-line conductor. Conversion operation with a de-rated maximum active power-output is performed in response to at least one of (i) the grid-side inverter and (ii) the generator-side inverter of the first converter-string being disabled, by disabling active power production of at least one of (i) the
(Continued)

grid-side inverter and (ii) the generator-side inverter of the second converter-string, or correspondingly reducing active power production of the second converter-string, thereby preventing a compensation current along the center-line conductor.

20 Claims, 9 Drawing Sheets

(51) Int. Cl.
    *H02P 29/02* (2016.01)
    *H02M 7/493* (2007.01)
    *H02P 29/032* (2016.01)
    *F03D 9/25* (2016.01)
    *H02J 3/38* (2006.01)
    *H02P 27/04* (2016.01)
    *H02P 101/15* (2016.01)

(52) U.S. Cl.
    CPC ............. *H02P 27/00* (2013.01); *H02P 27/04* (2013.01); *H02P 29/02* (2013.01); *H02P 29/032* (2016.02); *H02P 2101/15* (2015.01); *H02P 2201/03* (2013.01); *Y02E 10/725* (2013.01); *Y02E 10/76* (2013.01)

(58) Field of Classification Search
    CPC . H02M 2001/0074; H02M 2001/0077; H02M 2001/325; H02M 5/458; H02M 5/4585; H02M 7/493; H02M 7/00; H02M 2001/0058; H02M 7/53873; F03D 9/255; H02J 3/386; H02P 2101/15; H02P 27/04; H02P 29/032; H02P 9/007; H02P 2201/03; H02P 27/00; H02P 29/02; Y02E 10/76
    See application file for complete search history.

(56) References Cited

U.S. PATENT DOCUMENTS

| | | | |
|---|---|---|---|
| 2005/0012339 A1* | 1/2005 | Mikhail | F03D 7/0224 290/44 |
| 2006/0097519 A1* | 5/2006 | Steinke | H02J 3/36 290/44 |
| 2008/0252142 A1* | 10/2008 | Davies | H02J 3/1864 307/42 |
| 2012/0267955 A1* | 10/2012 | Zhan | H02J 1/06 307/31 |
| 2013/0182465 A1 | 7/2013 | Wang et al. | |
| 2013/0197704 A1* | 8/2013 | Pan | H02J 3/36 700/287 |
| 2015/0002106 A1* | 1/2015 | Inagaki | H02M 5/4585 322/79 |
| 2016/0028321 A1* | 1/2016 | White | H02M 5/458 363/37 |
| 2016/0241153 A1* | 8/2016 | Abeyasekera | H02M 7/493 |
| 2017/0331295 A1* | 11/2017 | Abeyasekera | H02J 3/386 |
| 2017/0358997 A1* | 12/2017 | Andersen | H02M 5/4585 |

FOREIGN PATENT DOCUMENTS

| | | |
|---|---|---|
| WO | 01/084689 A1 | 11/2001 |
| WO | 2011160642 A2 | 12/2011 |
| WO | 2012097816 A1 | 7/2012 |
| WO | 2014109989 A2 | 7/2014 |

OTHER PUBLICATIONS

Blaabjerg F et al: "Power electronics and controls for wind turbine systems", Energy Conference and Exhibition (Energycon), 2010 IEEE International, IEEE, Dec. 18, 2010 (Dec. 13, 2010), pp. 333-344.

International Search Report for Application No. PCT/DK2016/ 050102 dated Jun. 9, 2016.

* cited by examiner

WIND TURBINE CONVERTER CONTROL

FIELD OF THE INVENTION

The invention relates to the field of wind turbine converter systems, more specifically to wind turbine converter systems that are arranged to maintain partial power production of the wind turbine converter system, even in the case of a fault of parts of the wind turbine converter system or low wind speed.

BACKGROUND

EP 2492504 A1 relates to the handling of faults of converter-unit(s) in a wind turbine converter system with parallel-connected converter-units. In the event of a fault of a converter-unit, the power converted by the faulty converter-unit is distributed among the other converter-units, respecting the maximum capacities of the other converter-units.

SUMMARY OF THE INVENTION

According to a first aspect, a method is provided of controlling a full-scale converter system for converting active power produced by a generator of a variable speed wind turbine to be fed to an electricity-grid. The converter system comprises a series-connection of parallel-connected generator-side inverters and a series-connection of parallel-connected grid-side inverters. The series-connections of the generator- and grid-side inverters are connected back to back on their DC sides to form a common DC link. Generator-side inverters and grid-side inverters at a same voltage level of the series-connection form at least first and second converter-strings. The generator-side and grid-side inverters form a generator-side and grid-side voltage-center-point, respectively, at a voltage level between the inverters connected in series, wherein the voltage-center-points are coupled together by a center-line conductor, wherein the method comprises performing a conversion operation with a de-rated maximum active power-output comprising:
in response to at least one of (i) the grid-side inverter and (ii) the generator-side inverter of the first converter-string being disabled, disabling active power production of at least one of (i) the grid-side inverter and (ii) the generator-side inverter of the second converter-string, or correspondingly reducing active power production of the second converter-string, thereby preventing a compensation current along the center-line.

According to a second aspect, a full-scale converter system for converting active power produced by a generator of a variable speed wind turbine to be fed to an electricity-grid is provided. The converter system comprises a converter control system, a series-connection of parallel-connected generator-side inverters and a series-connection of parallel-connected grid-side inverters. The series-connections of the generator- and grid-side inverters are connected back to back on their DC sides to form a common DC link. Generator-side inverters and grid-side inverters at a same voltage level of the series connection form at least first and second converter-strings. The generator-side and grid-side inverters form a generator-side and grid-side voltage-center-point, respectively, at a voltage level between the inverters connected in series, wherein the voltage-center-points are coupled together by a center-line conductor. The converter control system is programmed to cause the converter system to perform conversion operation with a de-rated maximum active power-output comprising: in response to at least one of (i) the grid-side inverter and (ii) the generator-side inverter of the first converter-string being disabled, disabling active power production of at least one of (i) the grid-side inverter and (ii) the generator-side inverter of the second converter-string, or correspondingly reducing active power production of the second converter-string, thereby preventing a compensation current along the center-line conductor.

GENERAL DESCRIPTION, ALSO OF OPTIONAL EMBODIMENTS OF THE INVENTION

According to a first aspect, a method is provided of controlling a full-scale converter system for converting active power produced by a generator of a variable speed wind turbine to be fed into an electricity-grid.

The full-scale converter converts variable frequency current, the frequency of which depends on wind speed, into a fixed frequency current, e.g. 50 Hz current, to be fed into an electrical grid. The electrical grid is herein also referred to as "electricity grid" or simply "grid".

A full-scale converter is a converter that converts (when not disregarding conversion losses) 100% of the variable frequency AC power-output of the generator into fixed-frequency AC active power fed into the grid.

The full-scale converter system comprises a series-connection of parallel-connected generator-side inverters and a series-connection of parallel-connected grid-side inverters. The series-connection of parallel-connected generator-side inverters is, for example, coupled to the generator and the series-connection of parallel-connected grid-side inverters is, for example, coupled to the transformer.

The generator-side inverters are rectifiers converting variable frequency AC-current into DC-current, whereas the grid-side inverters are used for converting DC-current to the fixed frequency AC-current.

Hence, for example, two generator-side inverters are connected to each other in parallel, wherein these parallel-connected inverters, lying on a first voltage level, are connected in series to two other generator-side inverters, lying on a second voltage level, that are connected to each other in parallel.

Likewise, for example, two grid-side inverters are connected to each other in parallel, wherein these parallel-connected inverters, lying on the first voltage level, are connected in series to two other grid-side inverters, lying on the second voltage level, that are connected to each other in parallel.

The series connections of the generator- and grid-side inverters are connected back to back on their DC sides to form a common DC link.

This back-to-back connection is, for example achieved by a positive potential conductor and a negative potential conductor connecting the parallel-connected inverters of the series-connection of grid-side and generator-side inverters that lie on a same voltage level.

Generator-side inverters and grid-side inverters at the same voltage level of the series-connection form at least first and second converter-strings.

Hence, for example, the generator-side inverters that operate on a positive potential are also referred to herein as generator-side inverters of a first converter-string that is, for example, a positive converter-string. These generator-side inverters of the positive converter-string are connected in series to parallel-connected generator-side inverters that operate at a negative potential, also referred to herein as generator-side inverters of a second converter that is, for example, a negative converter-string.

The generator-side and grid-side inverters form a generator-side and grid-side voltage-center-point, respectively, at a voltage level between the inverters connected in series.

By connecting the generator-side inverters of the series-connection of generator-side inverters that lie on a positive potential to the generator-side inverter of the series-connection that lie on a negative potential, for example, the generator-side voltage-center-point is formed.

Likewise, by connecting the grid-side inverters of the series-connection of grid-side inverters that lie on a positive potential to the grid-side inverter of the series-connection that lie on a negative potential, for example, the grid-side voltage-center-point is formed.

The generator-side and grid-side voltage-center-points are electrically connected by a center-line conductor.

Thereby, the inverters connected to the positive potential conductor as well as to the center-line conductor form, for example, a first converter-string lying on positive potential (positive converter-string). Likewise, the inverters connected to the negative potential conductor as well as to the center-line conductor form, for example, the second converter-string lying on negative potential (negative converter-string). However, the assignment of "first" and "second" to a positive converter-string or negative converter-string is interchangeable.

The method comprises performing conversion operation with a de-rated maximum active power-output.

Conversion operation is referred to herein as the operation of converting variable frequency AC-current produced by the wind turbine generator to fixed frequency AC current to be fed into the grid. The de-rated maximum power-output is, depending on the actual number of converter units installed, for example, 12.5%, 25% or 50% of the maximum active power output of the wind turbine converter system.

The term "maximum active power-output" is used herein as a threshold for the active power-output, for example, given by physical upper limits of the converter-system. Performing conversion operation with the de-rated maximum active power-output is, therefore, performing conversion operation with a reduced upper limit of active power-output.

Performing conversion operation with the de-rated maximum power-output comprises, in response to at least one of (i) the grid-side inverter and (ii) the generator-side inverter of the first converter-string being disabled, disabling active power production of at least one of (i) the grid-side inverter and (ii) the generator-side inverter of the second converter-string.

When the grid-side or a generator-side inverter of the first converter-string is disabled, the momentary active power output of the first converter-string is reduced by the momentary active power-output of the generator-side or grid-side inverter disabled. Also the maximum active power-output of the first converter-string is reduced by the maximum active power-output of the generator-side or grid-side inverter disabled.

In response to at least one of (i) the generator-side inverter or (ii) the grid-side inverter of the first converter-string being disabled, the active power production of at least one of (i) the grid-side inverter and (ii) the generator-side inverter of the second converter-string is disabled, for example by deliberately, i.e. not due to a fault of the inverter(s), disabling the inverter(s) of the second converter-string. This is a way of reducing the momentary active power output, as well as the maximum active power-output, of the second converter-string too.

If an inverter is disabled, the active power-production of this inverter is also disabled.

Alternatively, the active power production of the second converter-string is correspondingly reduced.

To provide an example, the active power production of the second converter-string is reduced such that that the active power-output of the second converter-string equals the reduced active power-output of the first converter-string that is reduced by at least one of (i) the generator-side and (ii) the grid-side inverter of the first converter-string being disabled.

The maximum active power-output of the second converter-string is thereby, for example, reduced by the maximum active power-output of the disabled generator-side inverters of the first converter string.

Also, for example, the momentary active power-output of the second converter string is reduced so as to equal the momentary active power-output of the first converter string reduced by at least one of (i) the generator-side and (ii) the grid-side inverter of the first converter-string being disabled.

By disabling active power production of at least one of (i) the grid-side inverter and (ii) the generator-side inverter of the second converter-string or correspondingly reducing the active power-output of the second converter-string, a compensation current along the center-line conductor is prevented. Without this disabling, or reducing, the active power output of the first and second converter-strings would be asymmetric, and a compensation current would be caused along the center-line conductor.

In the above-described arrangement of series-connected parallel connections of inverters on the generator-side and on the grid-side, an asymmetric active power-output of the first and second converter-string causes a compensation current to flow along the center-line conductor.

The compensation current caused by an unequal power-output of the two converter-strings, corresponds, in the extreme case, to the difference between the first and second converter-strings' maximum active power-output. Hence, the compensation current corresponds, in this extreme case, to the maximum power-output of the at least one converter unit of the first converter-string, the generator-side and/or grid-side inverter of which was disabled.

The compensation current is, for example, typically given by the active power-output of the disabled generator-side or grid-side inverter of the first converter-string divided by a DC-link voltage of the first converter-string, for example, the voltage between the voltage-center-point and the positive or negative potential conductor, whichever is part of this first converter-string.

Disabling, for example, as many generator-side or grid-side inverters of the second converter-string as necessary to equal the reduced active power-output of the first converter-string prevents compensation currents along the center-line conductor that would be caused by an asymmetric active power-output of this converter-string when operated at maximum active power-output.

To provide an example, in response to one generator-side inverter of the first converter-string being disabled, the active power production of a generator-side inverter of the second converter-string with an active power-output equal to the disabled generator-side inverter of the first converter-string, is also disabled.

However, to prevent the compensation current in an alternative way, the active power-output of the second converter-string is, for example, correspondingly reduced without disabling any inverters of the second converter-string. This is achieved, for example, by these inverters performing conversion operation with a lower active power-output target value and a lower upper limit for the active power-output of the second converter-string.

Subsequent to the active power production of the inverter of the second converter-string being disabled or, correspondingly, the active power output of the second converter-string being reduced, the first and second converter-strings are driven to produce an equal active power-output at or below the de-rated maximum power-production, for example, by the converter system controller providing equal active-power target values to them.

In some embodiments, conversion operation with the de-rated maximum active power-output is performed by disabling at least one of (i) the grid-side inverter and (ii) the generator-side inverter of the first converter-string and by disabling at least one of (i) the grid-side inverter and (ii) the generator-side inverter of the second converter-string, in response to receiving AC input power from the generator that is lower than the de-rated maximum active power-output.

When the converter units perform conversion operation by rectifying variable frequency AC current and inverting the resulting DC current to fixed frequency AC current, this causes power-conversion-dependent power-losses. These conversion losses, are in general, dependent on a working point of the converter-units. The working point of the converter-units is at its best (the one with lowest conversion losses) when they are operated close to their maximum active power-output. Hence, their operation at an input-power substantially lower than their maximum power-conversion capability causes conversion losses that are high compared to the conversion-losses when they are operated close to their maximum active power-output.

Accordingly, when the converter-system receives an AC input power from the generator that is lower than the de-rated maximum active power-output—triggered, e.g. by low wind-speed conditions—the converter system performs conversion operation with the de-rated maximum power-output.

In this case the conversion operation with reduced maximum active power-output is performed by disabling at least one of (i) the grid-side inverter and (ii) the generator-side inverter of the first converter-string and by disabling active power production of at least one of (i) the grid-side inverter and (ii) the generator-side inverter of the second converter-string, for example, such that the maximum active power-outputs of the two converter-strings are equal, but, however, reduced.

The inverters are disabled, for example, by shutting them down or by shutting these inverters down and disconnecting the inverts from their respective connections to the generator or the transformer. Also the active power-production of the inverters of the second converter string is disabled in this way.

To provide an example, a 1 MW wind turbine, equipped with the above-described converter system comprising two converter-strings with two 250 kW converter units formed by a grid-side inverter and a generator-side inverter of the converter-string in each converter-string, receives only 400 kW input power from the wind turbine generator. In this case instead of producing approximately 400 kW active power by two converter-units in a converter-string, this active power-output is produced, for example, only by one converter-unit of the first converter-string and only one converter-unit of the second converter-string.

This is achieved, for example, by disabling both inverters of one 250 kW converter unit of the first converter-string and reducing the power-output of the second converter-string accordingly by also disabling both inverters of one 250 kW converter-unit of the second converter-string.

Instead of converting a 400 kW input power with four converter-units of the two converter-strings online, capable of producing an active power-output of 1 MW, the 400 kW input power is converted with only two converter-units of the converter-string, capable of an active power output of 500 kW. In this way conversion losses of the converter system are reduced. The conversion operation with the de-rated maximum active power-output was performed since the momentary AC input power of the converter system was only 400 kW and thereby lower than the de-rated maximum active power-output of 500 kW of this wind turbine converter system.

In some embodiments at least one of (i) the grid-side inverter and (ii) the generator-side inverter of the first converter-string is disabled due to a fault.

Performing conversion operation with the de-rated maximum active power output is triggered by a fault of at least one of (i) the generator-side inverter or (ii) the grid-side inverter of the first converter-string, as the inverter is either disabled due to a severe fault (when, e.g. the faulty inverter is not capable of producing active power anymore) or is actively disabled in response to a fault that would allow active power production to continue at a reduced level (which would, however, be possibly harmful for other inverters of the first converter-string). To provide an example, performing conversion-operation with the de-rated maximum active power output is triggered by the temperature of the inverter being already too high, although its active power-production is still at least partly functional.

Hence, in response to at least one of (i) the grid-side inverter and (ii) the generator-side inverter of the first converter-string being disabled due to the fault, the active power production of at least one of (i) the grid-side inverter and (ii) the generator-side inverter of the second converter-string is disabled, or the active power production of the second converter-string is correspondingly reduced, as described above.

In some embodiments in response to a grid-side inverter of a converter-string being disabled, active power-production of a generator-side inverter of the same converter-string is also disabled and when a generator-side inverter of a converter-string is disabled, active power-production of a grid-side inverter of the same converter-string is also disabled.

When, for example, the grid-side inverter of a converter-string has suffered a fault and is thereby disabled, the DC-output power of the generator-side inverter of the converter unit and also of the other generator-side inverters of the converted string, can no longer be converted to fixed frequency AC output-power and fed to the grid by the grid-side inverter. This may lead to an overload on the other grid-side inverters of the converter-string that may also suffer a fault due to this overload. Hence, the generator-side inverter of the converter-string is also disabled so as to reduce the DC-power fed to the DC-link accordingly and thereby prevent this effect.

If, in turn, a generator-side inverter of the converter-string suffers a fault and is thereby disabled, the grid-side inverters may not perform their conversion operation from DC-input power to an AC active power-output fed into the grid, at an optimal working point, as they receive DC-input power that is, for example, lowered by the DC-power fed into the DC link by the now disabled generator-side inverter.

To restore an optimal working point of the grid-side inverters by supplying them with DC current close to their maximum active power-production capability, for example, the grid-side inverter of the converter-string is also disabled, in the event of a fault of the generator-side inverter of that converter-string.

By disabling both the generator-side and grid-side inverter of the second converter-string when performing the conversion operation with the de-rated active power-output, the conversion operation is performed at a better working point than when only one (either the generator-side or grid-side inverter of the second converter-string) is disabled. This is the case, as the not-disabled inverters of that converter-string perform then conversion operation close to their maximum active power-output.

In some embodiments, disabling active power production of a grid-side or generator-side inverter comprises not transmitting pulse-width modulation commands to the disabled generator-side or grid-side inverter anymore.

Inverters typically comprise insulated-gate bipolar transistor (IGBT) switches that are controlled by pulse width modulation (PWM) commands in order to determine their opening and closing time to convert AC-current to DC-current or vice versa at a certain voltage, phase and frequency.

Disabling the inverter, comprises, for example, stopping a transmission of these PWM commands to this inverter as well as shutting down the inverter.

In some embodiments the converter system comprises at least one circuit breaker on the AC side of the generator-side inverters, used to disable the generator-side inverter by disconnecting the connection between the generator-side inverter and the generator and the converter system comprises at least one circuit breaker on the AC side of the grid-side inverters, used to disable the grid-side inverter by disconnecting the connection between the grid-side inverter and the transformer.

A generator-side circuit breaker is, for example, provided for each generator-side inverter. The circuit breakers are, for example, mechanical switches. These switches physically disconnect current paths which branch off from a current path connecting the converter system as a whole to the generator, wherein these branched-off current paths are the current paths leading to single generator-side inverters, when demanded by the converter control system.

In the same way, for example, a grid-side circuit breaker is provided for each grid-side inverter. These circuit breakers physically disconnect current paths which branch off from a current path connecting the converter system as a whole to the transformer, wherein these branched-off current paths are the current paths from single grid-side inverters to the transformer.

When the converter system is operating with the de-rated maximum active power-output and a fault occurs, generator-side or grid-side circuit breakers are, for example, automatically actuated by fault-sensors. As is further described below, these sensors disconnect and thereby disable, for example a faulty grid-side or generator-side inverter of the first converter-string and disconnect and thereby disable at least one of (i) the generator-side inverter and (i) the grid-side inverter of the second converter-string correspondingly.

Alternatively, these circuit breakers are actuated so as to disconnect generator-side or grid-side inverters, for example, subsequent to shutting these inverters down when performing conversion-operation at the reduced maximum active power output in response to, for example, a low wind-speed condition as described above.

In additional to these circuit breakers, for example, fuses are provided in the current path(s) leading to the converter-units. These fuses disconnect said current paths in the event of an overcurrent, which may arise due to specific faults of a converter-unit, such as a short-circuit in one of the generator-side inverters of the corresponding converter-unit.

By providing the current paths with fuses as well as with circuit breakers it possible to disconnect the current paths (e.g. if an overcurrent occurs that would damage the fuses of the converter system) within fractions of seconds, i.e. faster than it would be possible with conventional circuit breakers. Furthermore, this makes it possible to disconnect the converter branches by means of the circuit breakers also if a converter fault of another type occurs which is detected by the fault sensors.

In some embodiments the fault of at least one of (i) the generator-side and (ii) the grid-side inverter is detected by at least one of (i) comparing at least one of (i) current, (ii) voltage, (iii) power measurements taken at a converter-string power-input and a converter-string power-output and (ii) by measuring the temperature of the inverter.

The fault in the converter unit is, for example, detected by comparing at least one of (i) current, (ii) voltage, (iii) power measurements taken at a converter-string power-input and a converter-string power-output. Hence, the connection point of a converter-string with the generator as well as the connection point of a converter-string with a transformer, is, for example, equipped with at least one of (i) current sensors, (ii) voltage sensors or (iii) power sensors.

In the case of a faulty generator-side or grid-side inverter, for example, a comparison of current, voltage and/or power measurements at the converter-string power-input and the converter-string power-output may serve as an indicator for the fault.

To provide an example, if the difference between a converter-string input-current measurement and a converter-string output-current measurement exceeds a given threshold, such as 20 percent of the inflow current, the converter-string is declared to be faulty.

Alternatively, when such measurements, for example, yield a significant difference between time-averaged inflow and outflow of current, without this state being demanded by any control commands, the converter-string is declared to be faulty.

A grid-side inverter of the parallel-connected grid-side inverters and a generator-side inverter of the parallel-connected generator-side inverters of the same converter-string can be seen as a converter-unit of the converter-string.

The conversion operation at the de-rated maximum active power-output can be used, for example, to identify which of such converter-units of the converter-string actually comprises the faulty generator-side and/or grid-side inverter. This converter-unit comprising the faulty generator-side or grid-side inverter is also referred to hereinafter as a faulty-converter unit.

When performing fault identification, for example, at least one converter-unit of the first-converter-string and at least one converter-unit of the second converter-string (the converter-units having substantially equal maximum active power-outputs) are disabled at a time, to perform power-conversion only, for example, with one converter-unit of the first string and one converter-unit of the second converter-string at a time.

This procedure is continued until a difference between at least one of (i) current, (ii) voltage and (iii) power output values exceeding a given threshold for this conversion operation at the de-rated maximum active power-output, occurs. In this way, the faulty converter-unit is identified.

Which inverter of the converter-unit is actually faulty can subsequently be identified by comparing the temperature of these inverters to temperature thresholds at a momentary active power-output of the inverter.

In some embodiments a fault of an inverter is detected by measuring the temperature of the inverter.

The temperature of an inverter is, for example, also taken as an indicator of a fault of the inverter. If, for example, the semiconductor switches of an inverter are faulty and cross-currents within the inverter occur, the input power received by the faulty inverter is not converted into AC/DC output power, but is merely transformed into heat.

For example, the temperature of the inverter exceeds a given upper temperature limit for performing conversion operation at a certain power-target, the inverter is declared to be faulty—which, for example, triggers the above-described performing of conversion-operation at the de-rated maximum active power-output in response to a fault.

In some embodiments correspondingly reducing the maximum active power-output of the second converter-string comprises setting an active power-output threshold to the maximum active power-output of the first converter-string.

In response to at least one of (i) the generator-side inverter and (ii) the grid-side inverter of the first converter-string being disabled, for example, the active power-output of the second converter-string is reduced correspondingly, i.e. such that the momentary active power-output and also the maximum active power-output of the first and second converter-strings is equal.

This is achieved, for example, by limiting the active power target-values to be reached by the second converter-string to the reduced momentary active power-output of the first converter-string and by setting an upper active power-production threshold for the second converter-string to the reduced maximum active power-output of the first converter-string, due to at least one of (i) the generator-side inverter and (ii) the grid-side inverter of the first converter-string being disabled.

In some embodiments, when performing conversion-operation at de-rated maximum active power-output, reactive power-production is still provided by grid-side inverters unless in the event of a grid-side inverter of the first converter-string being disabled due to a fault of this grid-side inverter.

Hence, only the generator-side inverter of a converter-string is disabled when performing conversion operation with de-rated maximum active power-output, while keeping the at least one grid-side inverter of the converter-string in operation.

Thereby all the grid-side inverter(s), provided that they have not suffered a fault, are kept in operation when performing the conversion-operation at de-rated maximum active power-output. Hence, for example, only the active power-production of generator-side inverters of the second converter-string is disabled to prevent the compensation current flowing along the center-line conductor.

This enables reactive power production by the grid-side inverters that are kept in operation, although conversion operation is performed at the de-rated maximum active power-output.

The grid-side inverters produce reactive power, for example, by converting the DC power produced by the not-disabled generator-side inverters of the converter-string into reactive power.

However, the grid-side inverters can also provide reactive power production by converting energy stored (e.g. in capacitors arranged between the negative/positive DC potential conductor and the center connection line and thereby associated to the first converter-string or the second converter-string) into reactive power. Thereby, at least until the storage elements in the DC-link are discharged, full reactive power-production can be achieved, even in the case that a generator-side inverter is disabled either due to a fault or when the converter-system is fed an active power-input that is below the de-rated maximum active power-output.

By keeping the grid-side inverters of a converter-unit in operation, when performing conversion operation at the de-rated maximum active power-output, the wind turbine converter system can actively participate in regulating grid voltage and compensating for voltage dips in the grid by injecting reactive power into the grid.

In some embodiments the converter system comprises energy dissipation units that dissipate power produced by the generator above the de-rated maximum active power-output, when performing conversion operation with the de-rated maximum active power-output in response to a fault of at least one of (i) the generator-side inverter or (ii) the grid-side inverter of the first converter-string.

When at least one inverter of the first converter-string is disabled as it suffered a fault, and conversion operation is thereupon performed with the de-rated maximum active power-output, the converter system may not be capable of receiving such excess power produced by the generator without suffering damage To prevent this from happening, the generator's power-output is reduced accordingly when performing conversion operation with the de-rated maximum active power output due to a fault. This is, for example, achieved by pitching rotor blades of the wind turbine out of the wind or throttling the generator's power-output by a braking operation, in order to reduce the rotation speed of a generator-shaft driving the generator to produce AC power, or throttling the wind turbine generator itself, for example, by a braking operation.

Since a timespan required, for example, to perform the pitching operation is at least in the range of seconds, while an overloaded converter system cannot receive an excessive amount of input-power for much longer than fractions of seconds without suffering damage, the converter system is equipped with said energy dissipation units that dissipate the power produced by the generator that exceeds the de-rated maximum active power output.

More precisely, these dissipation units dissipate the excess power produced by the generator as a first countermeasure, until the power-output of the generator is finally reduced as a second countermeasure, for example, by pitching rotor-blades of the wind turbine out of the wind.

The energy dissipation units are, for example, realized as switchable high Ohmic resistive elements, for example, with a resistivity of several MΩ, arranged in the current path leading from the generator to the converter system, or in the DC-link of the converter system. "Switchable" means in this context that before a fault in a converter-unit is detected, for example, no current flow is established through these resistive elements, as, for example, a current path leading to these resistive elements is interrupted by a switch that is closed if a fault in a converter-unit is detected.

Such switchable resistive elements serving as energy dissipation units are for, example, connected to the current path leading from the generator to the converter system and are thereby provided between the generator and the converter system.

In some embodiments, the energy dissipation units are located in the common DC link of the converter system.

In these embodiments, the energy dissipation units of the first/second string are, for example, connected to the positive/negative potential conductor as well as to the center-line conductor, such that DC current flows through the dissipation units, when they are actuated, for example by closing physical switches in the current path leading to said dissipation units.

As the energy dissipation units are arranged, for example, in the DC-link they protect non-faulty grid-side inverters from receiving over-currents if there is a fault of a grid-side inverter of a converter-string, in the absence of a fault of any generator-side inverter.

In some embodiments, the parallel-connected generator-side inverters of the first and second converter-string are fed with variable frequency AC current from the generator by a first and a second separate generator windings, respectively.

Thereby, the generator-side inverters of the positive converter-string are fed by a separate generator winding that is different to the separate generator winding feeding the generator-side inverters of the second converter-string. The separate generator-windings are electrically insulated from each other. The series-connection of the first and second converter-string on the generator-side is achieved by coupling out the AC voltage and current induced in the first generator winding through the positive DC-level conductor and by coupling out the AC voltage and current induced in the second generator winding through the negative DC-level conductor and connecting the first converter-string to the second converter-string by the center-line conductor.

In some embodiments, the parallel-connected grid-side inverters of the first and second converter-string feed fixed frequency AC current through separate first and second transformer windings to the electricity grid, respectively.

The separate transformer windings are also electrically insulated from each other. The series-connection of the converter-strings on the grid-side is achieved by feeding the first transformer winding with AC current that was generated by the grid-side inverters by inverting DC current from the positive potential conductor of the positive converter-string and by feeding the first transformer winding with AC current that was generated by the grid-side inverters by inverting DC current from the negative potential conductor of the second converter-string and connecting the positive converter-string to the second converter-string by the center-line conductor.

In some embodiments, the at least one generator-side inverter is located in a nacelle of the wind turbine and the at least one grid-side inverter is located in the basis of a tower of the wind turbine. Thereby, the weight of the nacelle is reduced which in turn reduces stress and wear of yaw bearings of the tower carrying the nacelle. Furthermore, as each inverter is also a heat source, the overall temperature in the nacelle acting on heat sensitive semiconductor parts of the inverters is reduced by placing the grid-side inverter outside the nacelle.

When the grid-side and the generator-side inverters are located remotely in this way, the center-line conductor, the positive potential conductor and the negative potential conductor, extend from the nacelle to the base of the tower of the wind turbine along the tower of the wind turbine.

According to a second aspect, a full-scale converter system is provided for converting active power produced by a generator of a variable speed wind turbine to be fed into an electricity-grid. The converter system comprises a converter control system, a series connection of parallel-connected generator-side inverters and a series-connection of parallel-connected grid-side inverters. The series-connections of the generator- and grid-side inverters are connected back to back on their DC sides to form a common DC link. Generator-side inverters and grid-side inverters at a same voltage level of the series-connection form at least first and second converter-strings. The generator-side and grid-side inverters form a generator-side and grid-side voltage-center-point, respectively, at a voltage level between the inverters connected in series, wherein the voltage-center-points are coupled together by a center-line conductor. The converter control system is programmed to cause the converter system to perform conversion operation with the de-rated maximum active power-output comprising: in response to at least one of (i) the grid-side inverter and (ii) the generator-side inverter of the first converter-string being disabled, disabling active power production of at least one of (i) the grid-side inverter and (ii) the generator-side inverter of the second converter-string, or correspondingly reducing active power production of the second converter-string, thereby preventing a compensation current along the center-line conductor that would be caused by an asymmetric active power-output of the first converter-string and the second converter-string.

The converter control system is, for example, programmed to carry out any one of the above described methods performed on any above described full-scale converter system described above.

BRIEF DESCRIPTION OF THE DRAWINGS

Exemplary embodiments of the invention are now described, also with reference to the accompanying drawings, wherein FIG. 1 schematically illustrates a wind turbine equipped with the converter system of FIG. 2, with generator-side inverters in the nacelle and grid-side inverters in the tower of the wind turbine.

The drawings and the description of the drawings are of examples of the invention and are not of the invention itself. Like reference signs refer to like elements throughout the following description of embodiments.

DESCRIPTION OF EMBODIMENTS

Figure 1:
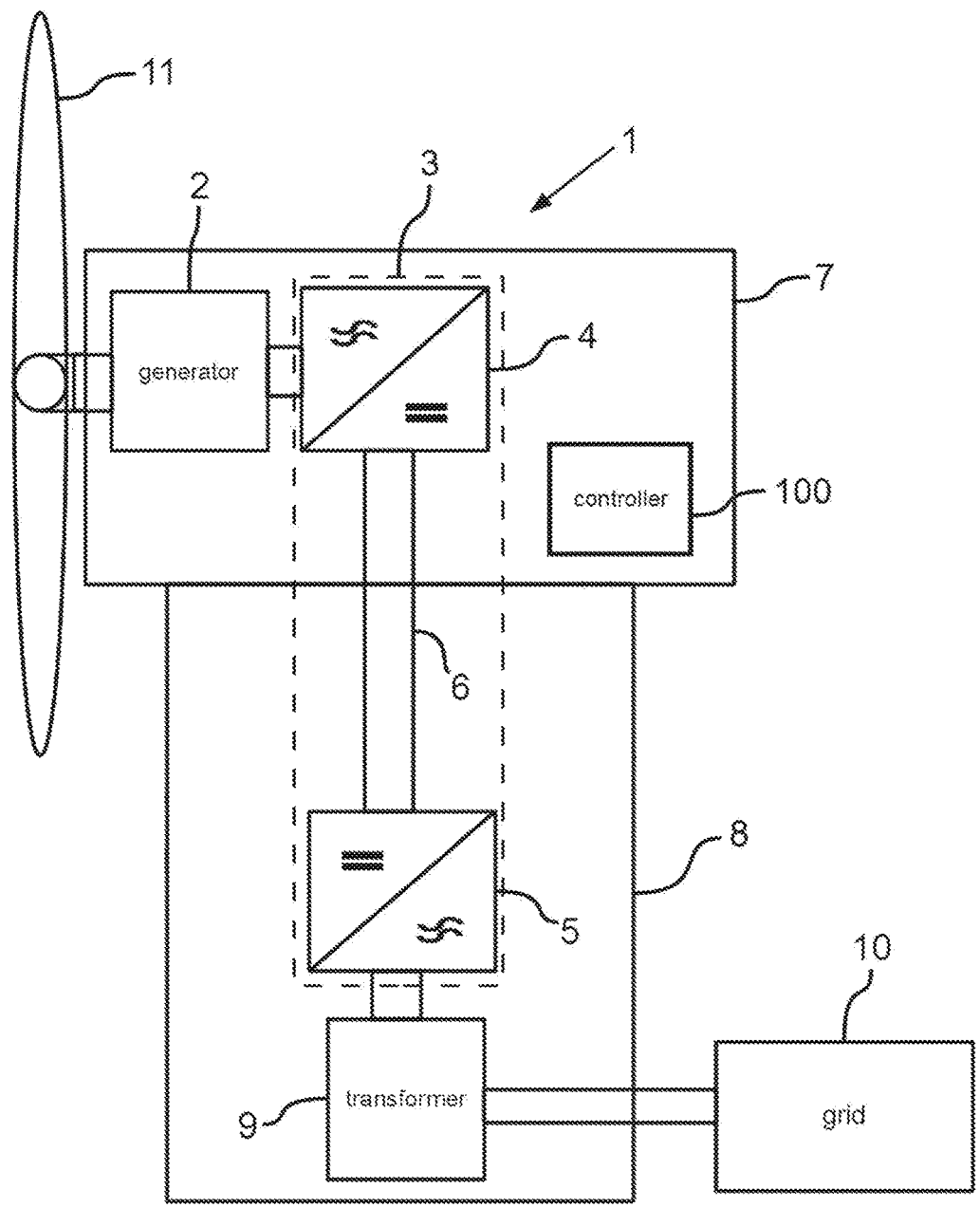

A wind turbine 1, schematically illustrated in FIG. 1, is equipped with rotor-blades 11, driving a generator 2. The generator is coupled to a converter system 3. The converter system 3, which is illustrated in more detail in FIG. 3, comprises a series-connection of generator-side inverters 4, located in the nacelle 7 of the wind turbine and a series-connection of grid-side inverters 5, located at the bottom of a tower 8 of the wind turbine. These series-connections 4, 5 are connected by a DC link 6 of the converter-unit 3. The converter system 3 first converts variable frequency AC current from the generator 2 into DC current via the generator-side inverter(s) 4. This DC current is transported to the series-connection of grid-side inverters 5 via the DC link 6 and converted to 50 Hz AC current by said series-connection of grid-side inverters 5. The resulting 50 Hz AC current is fed to a transformer 9 which injects this current into an electricity grid 10.

Figure 2:
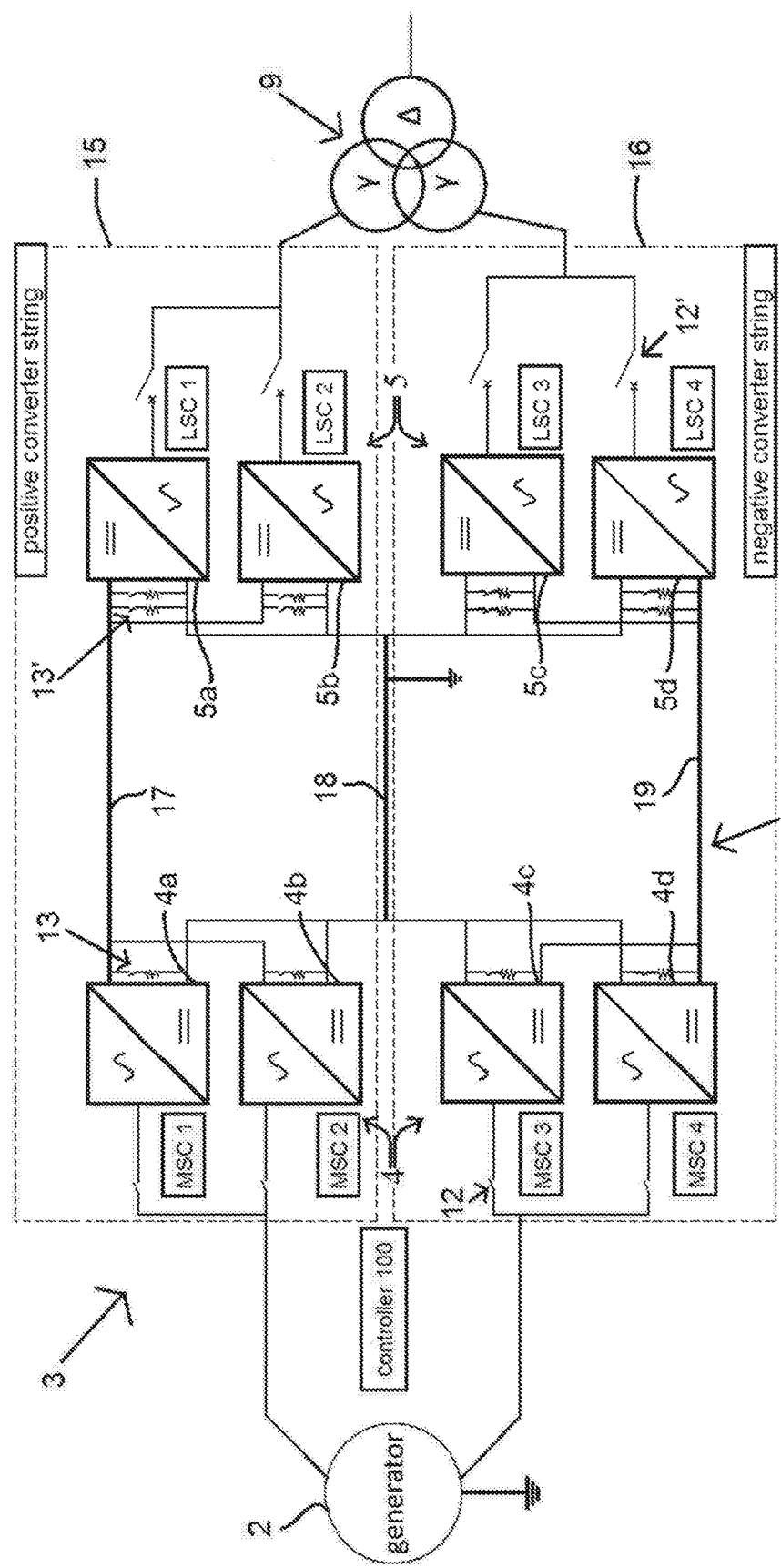
FIG. 2 is a schematic circuit diagram of a converter system with a series connection of parallel-connected generator-side inverters and a series-connection of parallel-connected grid-side inverters coupled by a common DC-link.

The converter system 3, a schematic circuitry diagram of which is shown in FIG. 2, is connected to the generator 2 via separate generator windings. The positive converter-string 15 is connected to the generator 2 by a first separate generator winding and the negative converter-string 16 is connected to the generator 2 by a second separate generator winding. The positive and negative converter-strings, represent the above-mentioned first and second converter-strings.

AC current produced by the first separate generator winding is fed to two electrically parallel-connected generator-side inverters of the positive converter-string 4a and 4b via current paths that are interruptible via circuit generator-side circuit breakers 12.

Likewise, AC current produced by the second separate generator winding is fed to electrically parallel-connected generator-side inverters of the negative converter-string, 4c, 4d. Also the current path leading to each of these inverters 4c, 4d is interruptible by a circuit breaker 12.

The parallel-connected generator-side inverters 4a, 4b of the positive converter-string are connected in series to the generator-side inverters 4c, 4d of the negative converter-string and thereby form the series-connection of parallel-connected grid-side inverters 4.

The parallel-connected generator-side inverters 4a, 4b of the positive converter-string or positive converter-string 15 are connected to parallel-connected grid-side inverters 5a, 5b of the same converter-string 15 by a positive potential conductor 17. The parallel-connected generator-side and grid-side inverters 4a, 4b, 5a, 5b, lying on positive potential, coupled by this positive potential conductor 17, form the positive converter-string.

Likewise, the parallel-connected generator-side inverters 4c, 4d of the negative converter-string are connected to parallel-connected grid-side inverters 5c, 5d of the negative converter-string 16 by a negative potential conductor 19. The parallel-connected generator-side and grid-side inverters 4c, 4d, 5c, 5d, lying on negative potential, coupled by the negative potential conductor, form the negative converter-string.

The parallel-connected grid-side inverters 5a, 5b of the positive converter-string are connected in series to the parallel-connected grid-side inverters 5c, 5d of the negative converter-string and thereby form the series-connection of parallel-connected grid-side inverters 5.

The series-connections of parallel-connected grid-side inverters and the series connection of parallel-connected generator-side inverters each form a voltage-center-point between the inverters of the positive converter-string and the negative converter-string. In the example shown in FIG. 2, these voltage-center-points are a neutral connection point on the grid-side and a neutral connection point on the generator-side, wherein the two neutral connection points are interconnected by the center-line conductor 18.

The positive potential conductor 17, the center-line conductor 18 and the negative potential conductor form the common DC link 6. The DC link is provided with switchable resistances, serving as grid-side and generator-side energy dissipations units 13, 13' respectively.

The grid-side inverters of the positive converter-string 15 are coupled to a first set of separate transformer windings, while the grid-side inverters of the negative converter-string are coupled to a second set of separate transformer windings. Thereby, the converter system 3 is coupled to the transformer 9. The connections of the grid-side inverters 5a, 5b, 5c, 5d to the separate transformer windings are interruptible by circuit breakers 12'.

In the converter system of FIG. 2, all generator-side and grid-side inverters of the converter system 4a, 4b, 4c, 4d, 5a, 5b, 5c, 5d are equally built and have an equal maximum active power-output. The conversion operation of the converter system 3 is controlled by a converter controller 100.

Figure 3:
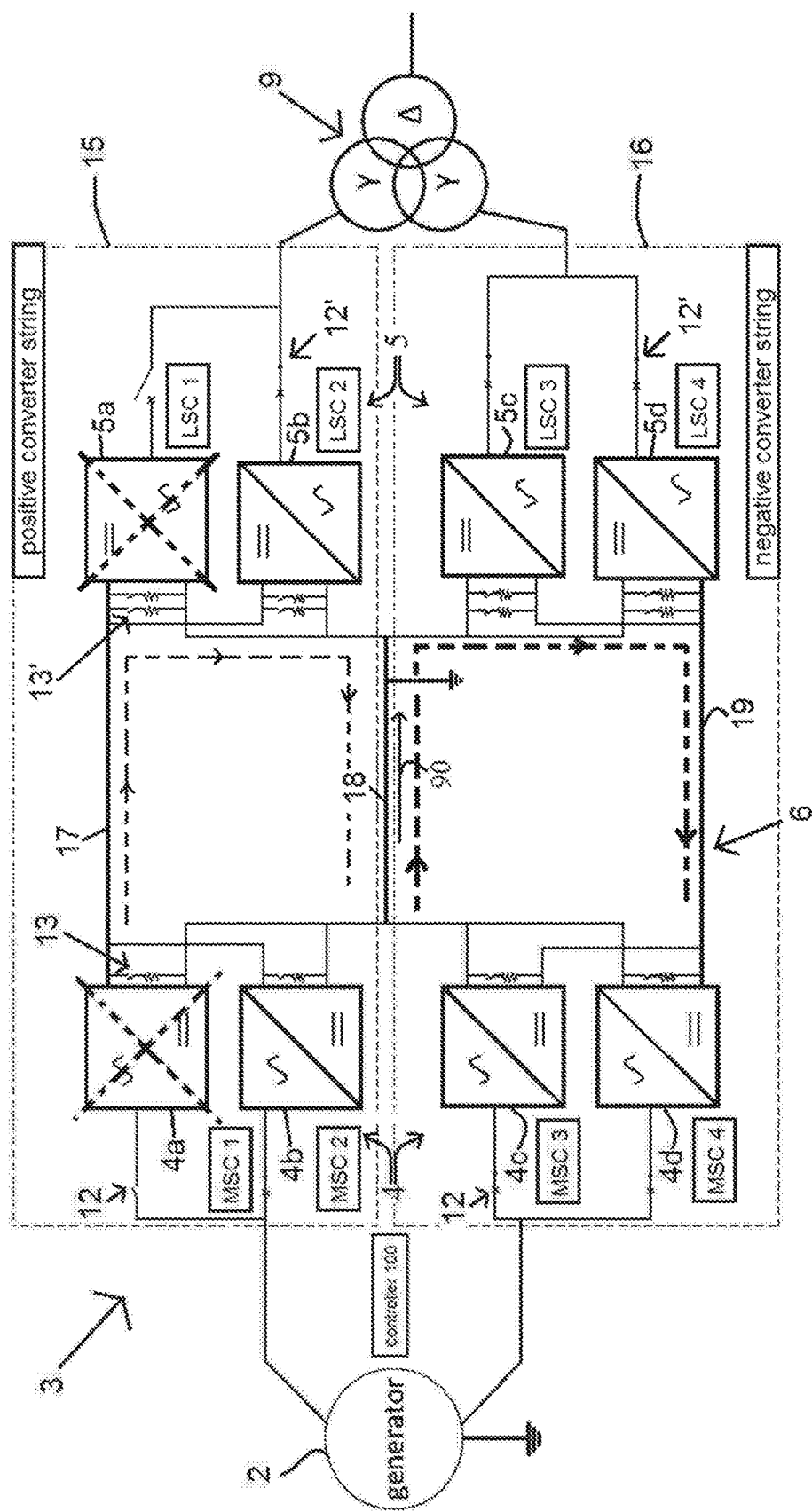
FIG. 3 is a schematic circuit diagram of the converter system of FIG. 2 with a generator-side and a grid-side inverter of the positive converter-string disabled and a compensation current caused by an asymmetric active power output of the first converter-string and the second converter-string.

The converter system previously described in conjunction with FIG. 2 with a generator-side and a grid-side inverter of the positive converter-string disabled is shown in FIG. 3. The disabled generator-side inverter 4a and grid-side inverter 5a of the positive converter-string 15 are crossed by dashed lines in FIG. 3 to indicate that they are disabled. The generator-side inverter 4a of the positive converter-string 15 is disabled by opening the associated generator-side circuit breaker 12 and the grid-side inverter 5a of the positive converter-string is disabled by opening the associated grid-side circuit breaker 12'.

The generator-side and grid-side inverters 4c, 4d, 5c, 5d of the negative converter-string 16 are, however, not disabled. Thereby, the maximum active power-output of the first converter-string 15 and the maximum active power-output of the second converter-string 16 are asymmetric, as the maximum active power-output of the negative converter-string 16 is higher than the maximum active power-output of the positive converter-string 15. When, for example, operating both converter-strings 15, 16 with their respective maximum active power output or at least at a power-output that is more than 50% of the maximum active power-output of the converter system 3, a compensation current 90 caused by an asymmetric active power-output of the first converter-string 15 and the second converter-string 16 occurs.

A current flow in the positive converter-string 15 and the negative converter-string 16 in this situation is shown in FIG. 3. The currents in the positive converter-string 15 and the negative converter-string 16 do not cancel each other out but rather form a non-zero compensation current 90 flowing along the center-line conductor 18.

When operating the wind turbine converter system 3 with a de-rated maximum active power-output, methods as described in conjunction with the following Figures are performed to prevent such a compensation current 90.

Figure 4:
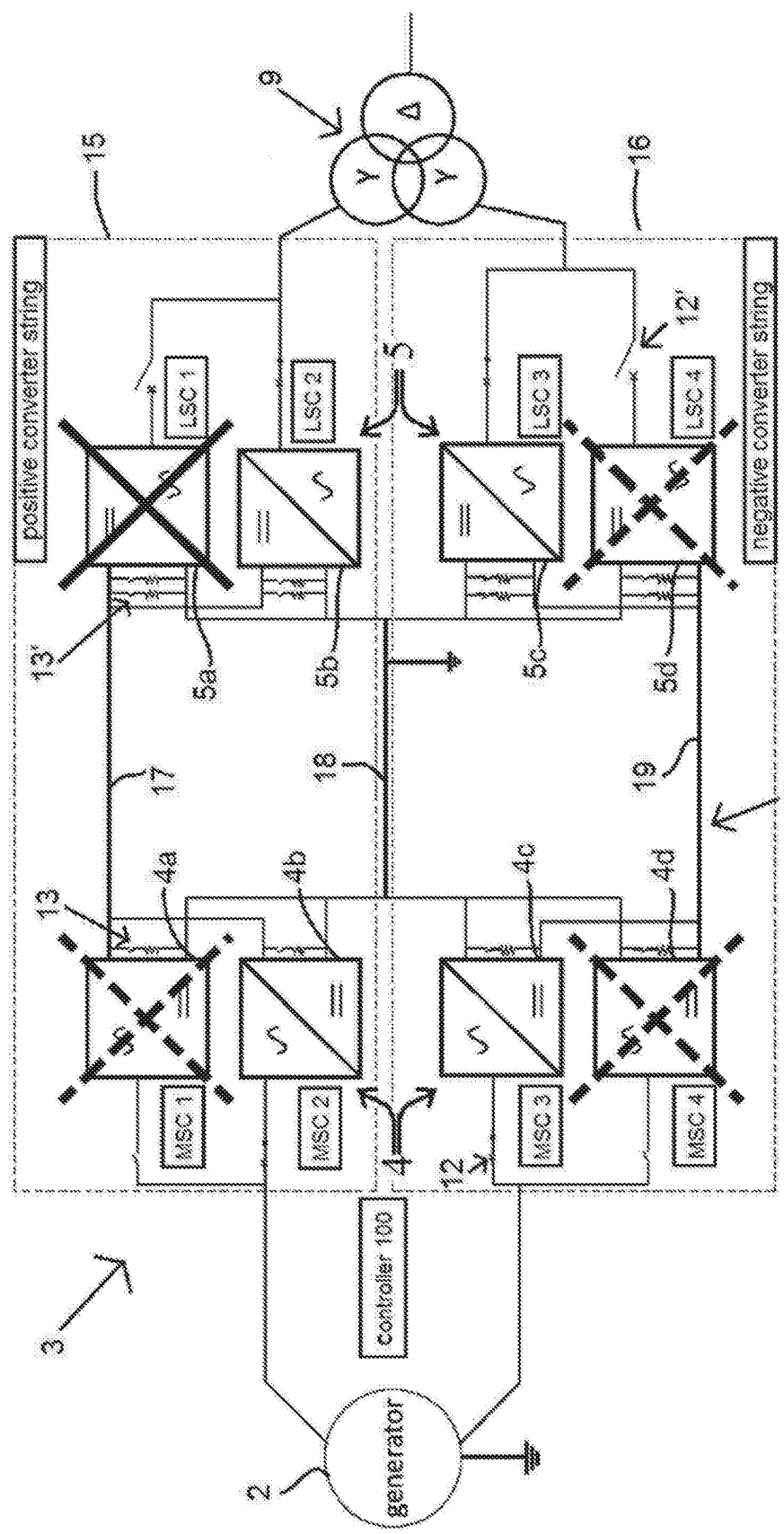
FIG. 4 is a schematic circuit diagram of the converter-unit of FIG. 2, wherein a generator-side and a grid-side inverter of the negative converter-string and a generator-side inverter of the positive converter-string are disabled in response to a grid-side inverter of the positive converter-string being disabled by a fault.

An exemplary method of performing conversion operation with the maximum active power-output, is shown in FIG. 4.

The grid-side inverter 5*a* of the positive converter-string 15 is disabled, for example, due to a fault of that grid-side inverter 5*a*. The fault is, for example, detected by a grid-side inverter controller LSC 1 associated with the faulty grid-side inverter 5*a*. In response to that fault, the grid-side inverter 5*a* is disconnected from the transformer by opening the associated grid-side circuit breaker 12'.

The fault of the grid-side inverter is marked in FIG. 4 by crossing out the faulty grid-side inverter with a full line.

Inverters that are deliberately disabled, i.e. not forced by a fault of the inverter, for example, by shutting them down and disconnecting them by means of associated generator-side or grid-side circuit breakers 12, 12' are marked, throughout the Figures, by the respective inverters being crossing out with a dashed line. When an inverter is disabled, the active power production of the inverter is disabled.

In response to the fault of inverter 5*a*, also a generator-side inverter of the positive converter-string, the generator-side inverter 4*a* is deliberately disabled, which is indicated in FIG. 4 by the generator-side inverter 4*a* being crossed out with a dashed line.

Disabling the generator-side inverter 4*a*, protects the non-faulty grid-side inverter 5*b* from receiving an input current from two generator-side inverters 4*a*, 4*b* that is higher than the maximum admissible input current for this grid-side inverter 5*b*. However, until the generator-side inverter 4*a* is disabled, an excessive current flow is dissipated by means of switchable resistive elements 13, serving as energy dissipations units.

To prevent a compensation current 90 over the center-line conductor 18, (which would be due to an asymmetric active power output of the positive and negative converter-string) the corresponding inverters 4*d* and 5*d* of the negative converter-string 16 are also deliberately disabled by shutting them down and opening associated grid-side and generator-side circuit breakers 12, 12'. Subsequently the positive and negative converter-string are driven to produce an equal active power-output at or below the de-rated maximum power-production by providing equal active-power target values to them by the converter system controller 100.

Figure 8:
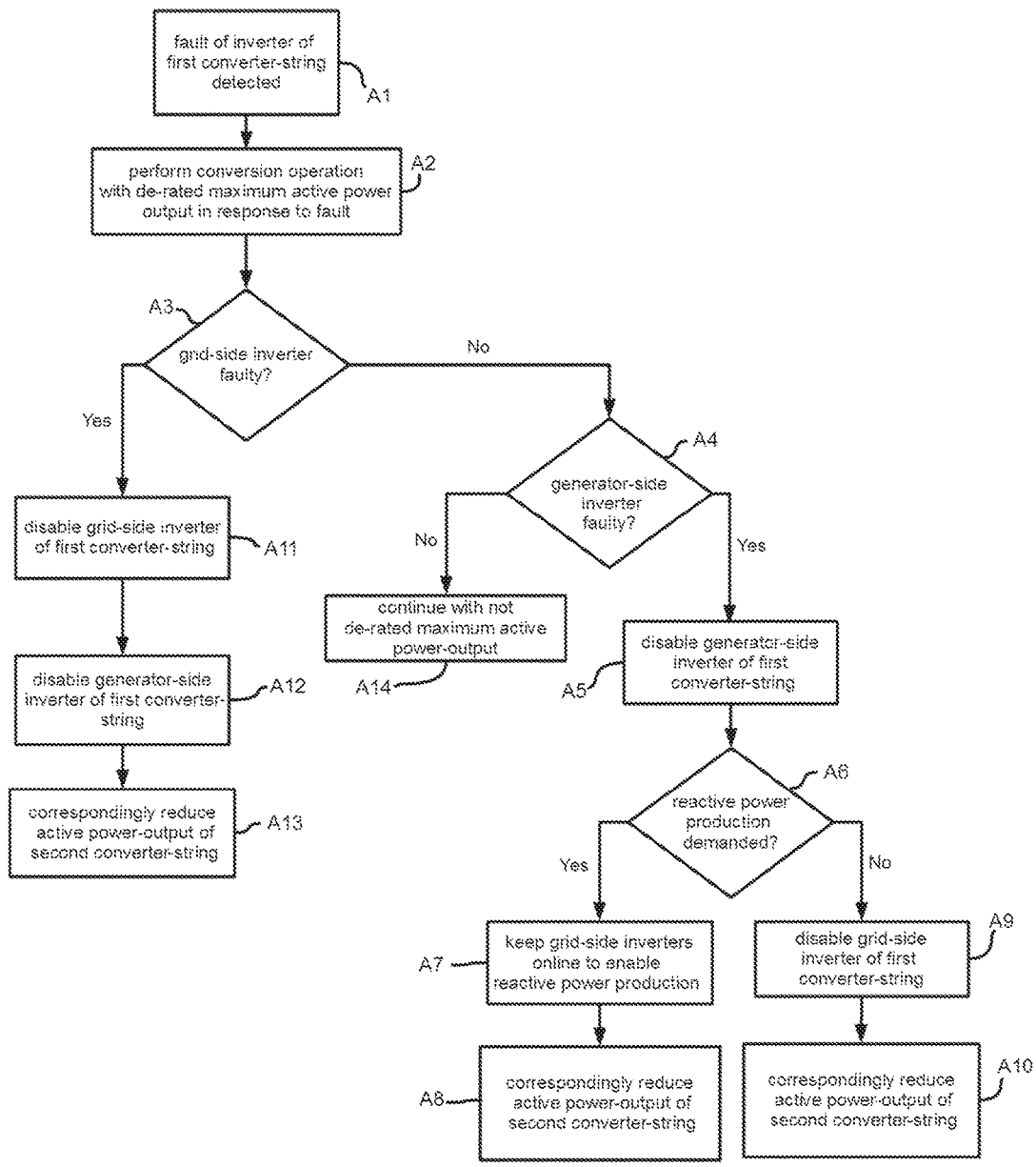
FIG. 8 is a schematic block diagram of performing power conversion with the de-rated maximum active power-output in response to a fault

Alternatively, as further described in conjunction with FIG. 8, the compensation current 90 can also be prevented by reducing the power-output of the negative converter-string correspondingly, for example, by setting the upper limit of the active power-production of the second converter-string to the reduced maximum active power-output of the positive converter-string and setting a momentary active power-output of the second converter-string to an value equal to the momentary power-output of the positive converter-string.

Furthermore, as the maximum active power-output of the positive and negative converter-string are now each reduced by 50%, the generator-output power is also reduced by 50%, for example by throttling this power-output and pitching wind turbine rotor blades 11 (not shown) out of the wind. To prevent an excess power-flow over the converter system when performing conversion-operation with the de-rated maximum active power-output is triggered by a fault, the amount of power fed by the generator 2 to the converter system 3 that exceeds this de-rated maximum active power-output is dissipated by means of the generator-side switchable resistive elements 13, until the power-output of the generator 2 is indeed brought below the de-rated maximum active power-output value.

Disabling an inverter of the converter unit 3, is for example, demanded by the converter system controller 100 that distributes this command to the generator-side inverter controllers MSC1, MSC2, MSC3, MSC4 of the generator-side inverters 4*a*, 4*b*, 4*c*, 4*d* of the series-connection of parallel-connected generator-side inverters 4 or to the grid-side inverter controllers LSC1, LSC2, LSC3, LSC4 of the grid-side inverters 5*a*, 5*b*, 5*c*, 5*d* of the series connection of parallel-connected generator-side inverters 5.

By performing the method described above, the not-disabled generator-side inverters 4*b*, 4*c* that are not disabled remain in operation and the grid-side inverters 5*b*, 5*c* that are not disabled also remain in operation. Thereby 50% of the converter systems maximum active power production is still achievable and no compensation current 90 along the center-line conductor 18 occurs, when performing conversion operation with the reduced maximum active power-output of the positive and negative converter-string.

Figure 5:
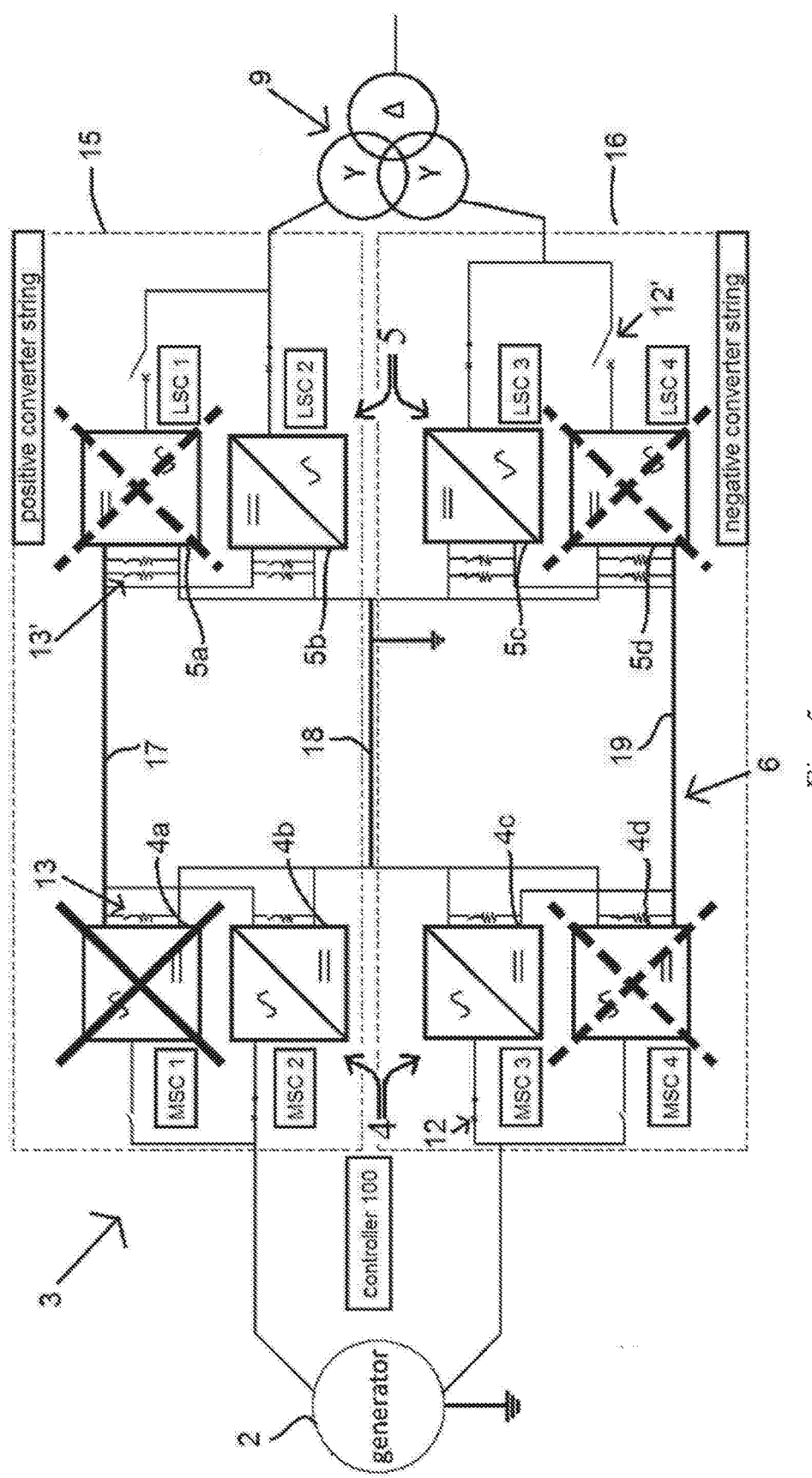
FIG. 5 is a schematic circuit diagram of the converter-unit of FIG. 2, wherein a generator-side and a grid-side inverter of the negative converter-string and a grid-side inverter of the positive converter-string are disabled in response to a generator-side inverter of the positive converter-string being disabled by a fault.

In the scenario shown in FIG. 5, the generator-side inverter 4*a* of the positive converter-string is disabled due to a fault, indicated by the generator-side inverter 4*a* being crossed out by a full line, as described also in conjunction with FIG. 4. The fault of this generator-side inverter is, for example, detected by the inverter controller LSC 1 of this inverter.

Subsequent to detecting the fault, the converter system controller 100 demands that a grid-side inverter of the positive converter-string 16, namely the grid-side inverter 5*a*, is also deliberately disabled.

Also in this scenario, the compensation current 90 can also be prevented by reducing the power-output of the negative converter-string correspondingly, for example, by setting the upper limit of the active power-production of the second converter-string to the reduced maximum active power-output of the positive converter-string and setting a momentary active power-output of the second converter-string to a value equal to the momentary power-output of the positive converter-string.

By disabling also the grid-side inverter 5*a* of the positive converter-string 15, the DC current fed to the still online grid-side inverter 5*b* originates only from the generator-side inverter 4*b* of the positive converter-string 15. Thereby, the grid-side inverter 5*b* still online is driven at an optimum working point, i.e. its overall conversion capacity is ideally exploited. This optimum working point for each the grid-side inverter 5*a* and 5*b* would not be reached by the DC-current fed to them by the single generator-side inverter 4*b*, as the grid-side inverters each would only receive a current corresponding to 50% of their conversion capability, assuming that the generator-side inverter 4*b* not disabled operates at maximum active power-output.

Additionally, the generator-side and the grid-side inverter 4*d*, 5*d* of the negative converter-string are disabled, as in the scenario described in conjunction with FIG. 4. Thereby compensation current 90 along the center-line conductor 18 that would be due to an asymmetric active power-output of the first and second converter-string is prevented.

Figure 6:
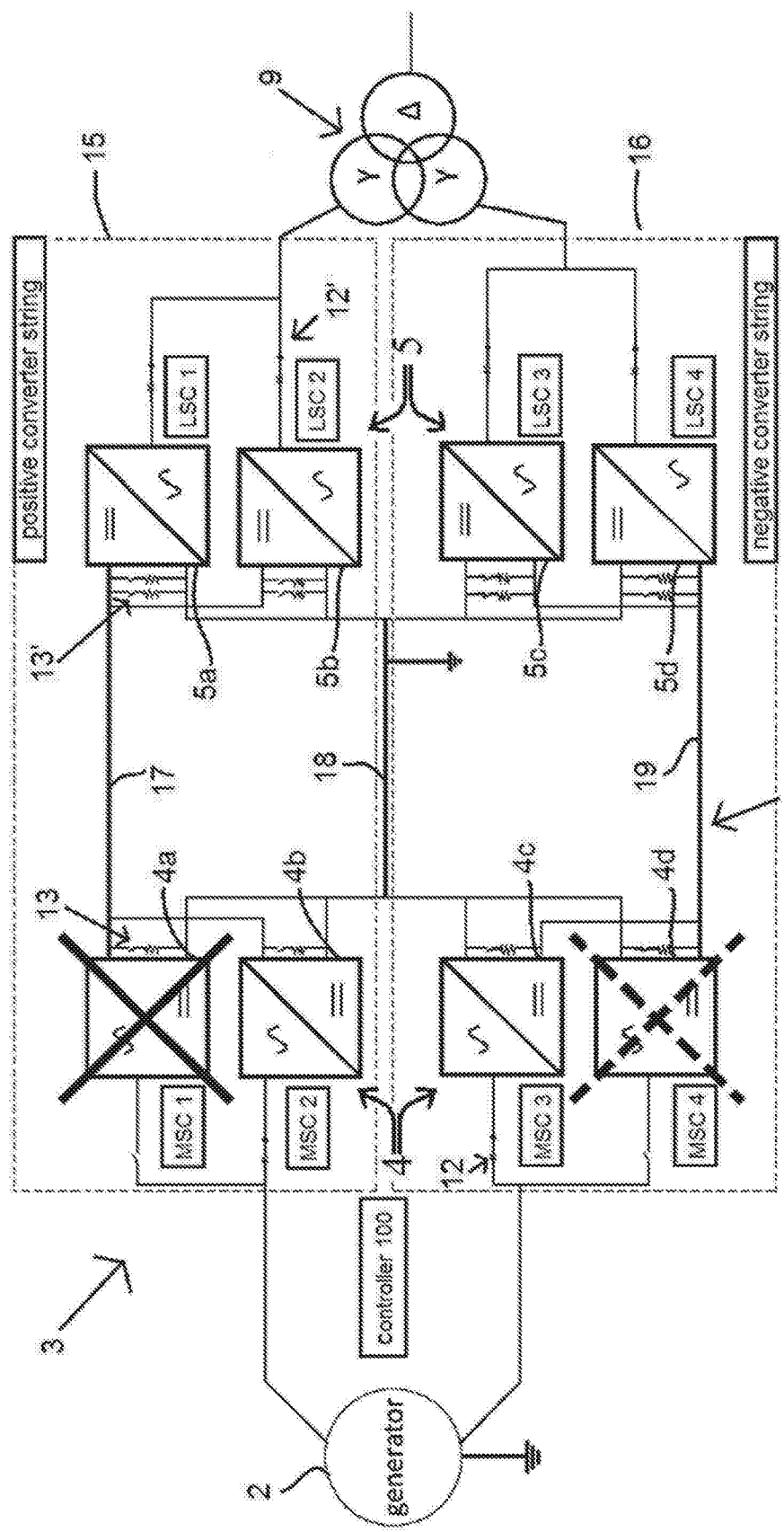
FIG. 6 is a schematic circuit diagram of the converter-unit of FIG. 2, wherein a generator-side inverter of the negative converter-string is disabled in response to a fault of a generator-side inverter of the positive converter-string.

In an alternative reaction to a fault of a generator-side inverter of the positive converter-string 15, such as the generator-side inverter 4a illustrated by FIG. 6, all the grid-side inverters 5a, 5b, 5c, 5d of the converter system 3 are kept in operation to provide for reactive power-production.

Subsequent to detecting the fault being detected in the generator-side inverter, for example by the associated inverter controller MSC 1, only a generator-side inverter of negative converter-string 16 (namely the generator-side inverter 4d) is deliberately disabled. Thereby, the ability of the grid-side inverters 15a, 15b, 16a, 16b to produce reactive power remains fully intact, while the current flowing along the center-line conductor is prevented, since the maximum active power-output of the positive converter-string and the maximum active power-output of the negative converter-string are now equal, and since the maximum active power-output of the generator-side inverter 4b and generator-side inverter 4c (hence the input for the grid-side inverters 5a, 5b, 5c, 5d) are also equal.

In this scenario too, the compensation current 90 can also be prevented by reducing the power-output of the negative converter-string correspondingly, for example, by setting the upper limit of the active power-production of the second converter-string to the reduced maximum active power-output of the positive converter-string and setting a momentary active power-output of the second converter-string to an value equal to the momentary power-output of the positive converter-string.

However, the methods of performing conversion operation with the de-rated maximum active power-output described above in conjunction with FIG. 4, FIG. 5 and FIG. 6 are also applicable when the conversion operation with de-rated maximum active power output is performed in response to an active power-output fed to the converter system 3 by the generator 2 being below the de-rated maximum active power, output, for example, due to a low wind speed condition. If the converter-systems nominal maximum active power-output is, for example, 1 MW and the de-rated maximum active power output is 500 kW and the generator 2 provides only an active output-power of 400 kW, performing conversion-operation at the de-rated maximum active power-output in any variant as described in conjunction with FIGS. 4 to 6 is triggered, with the only difference that no inverter is disabled due to a fault, but rather all disabled inverters are deliberately disabled.

Figure 7:
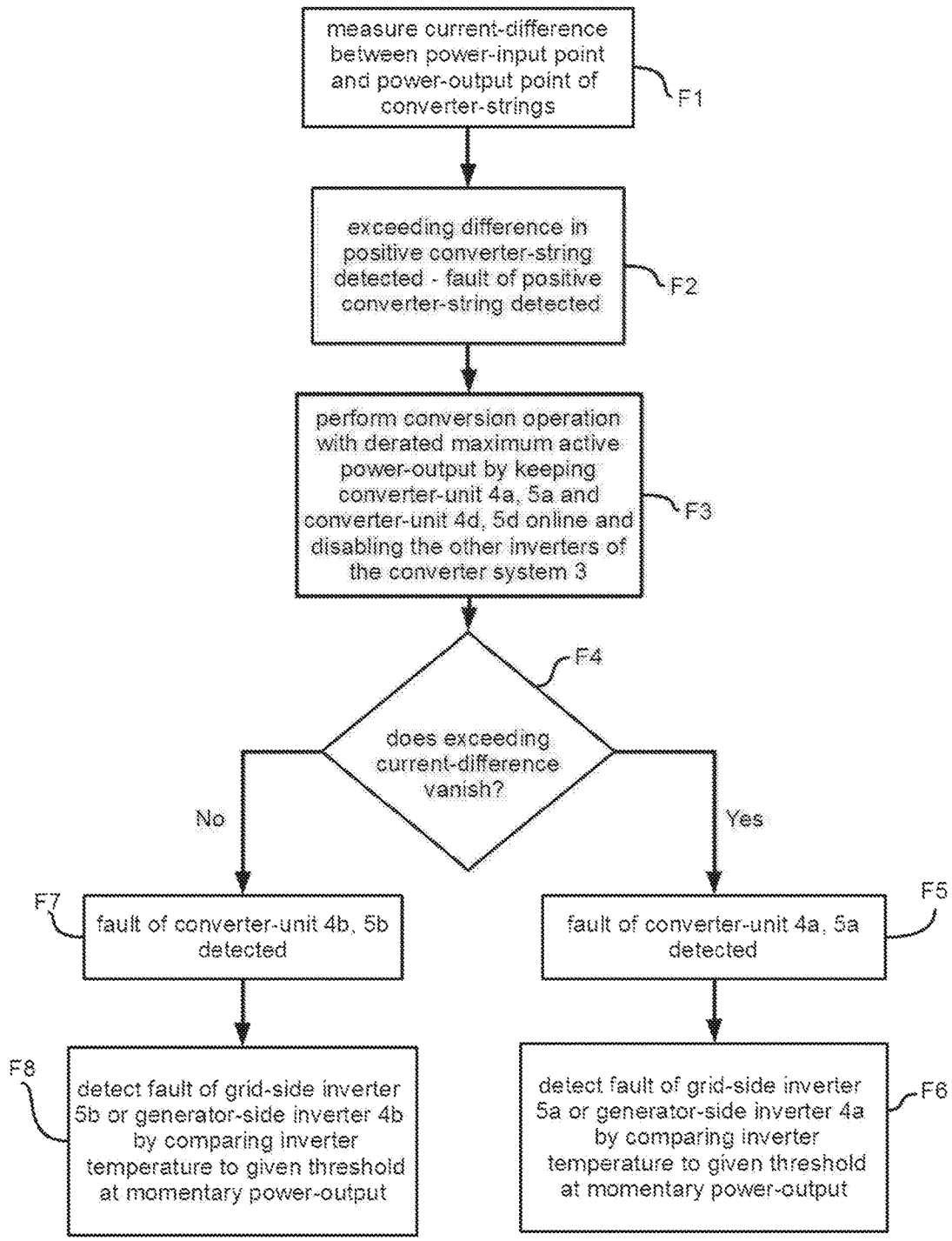
FIG. 7 is a schematic block diagram of a fault detection method in the wind-turbine converter-system of FIG. 2

The detection of a fault of a converter-unit formed by a generator-side and a grid-side inverter and, more precisely, a fault of a grid-side or generator-side inverter of the converter unit is illustrated by the block diagram of FIG. 7. This method of detecting a fault is performed in this example with the converter system 3 of FIG. 2.

An AC input-current fed from the generator to the converter-string is measured at the power-input of the converter-string. Likewise, an AC-output current fed to the converter-string to the converter-system is measured at the power-output of the converter-string. A current-difference between these two current measurements is obtained in activity F1. This current-difference is compared to a given threshold in activity F2 and the positive converter-string is declared to be faulty as the current-difference obtained for this converter-string exceeds the given threshold.

Upon this detection of a fault of the converter-string, the conversion operation is performed with the de-rated maximum active power-output in order to detect the fault in activity F3. First a converter unit of the positive converter-string formed by the generator-side inverter 4a and the grid-side inverter 5a and a converter unit of the negative converter-string formed by the generator-side inverter 4d and the grid-side inverter 5d are kept online, while disabling the other inverters of the converter system.

The current-difference between currents at the AC-input of the positive-converter-string and the AC-output of the positive-converter-string is further monitored. When the exceeding current-difference vanishes after disabling the converter-units formed by inverters 4b, 5b and 4c, 5c, while keeping the converter units formed by inverters 4a, 5a and 4d, 5d online, a fault of the converter-unit comprising the inverters 4a, 5a has been detected. However, if the current-difference does not vanish, this corresponds to the detection of a fault of the converter-unit comprising the inverters 4b, 5b, has been detected.

Upon detection of the fault in the converter unit, and by measuring the temperature of the generator-side and the grid-side inverter of the converter-unit, it is possible to detect whether the fault is a fault of the generator-side or the grid-side inverter of the converter-unit or both inverters by comparing the inverters temperatures with admissible temperatures for these inverters. If the temperature of an inverter exceeds the admissible temperature, it is declared to be faulty.

A block diagram of an exemplary way of performing conversion operation with de-rated maximum active-power output in response to a fault of an inverter of a converter-unit, is shown in FIG. 8. Upon detecting the fault in a first converter-string in activity A1, the conversion operation is performed with the de-rated maximum active power output in activity A2. When the grid-side inverter of the first converter-string is determined to be faulty, the grid-side inverter is disabled in activity A11. Substantially at the same time, the generator-side inverter of the first converter-string is also disabled in activity A12.

The active power-output of the second converter-string is correspondingly reduced in activity A13. In this activity, the maximum active power-output of the second converter-string as well as the momentary active power-output of the second converter-string is set equal to the reduced maximum active power-output of the first converter-string and the momentary active power output of the first converter-string (probably reduced by the fault), respectively. In this way a compensation current along the center-line conductor is prevented.

If the detected fault is a fault of the generator-side inverter of the first converter-string, the faulty generator-side inverter is disabled in activity A5. In activity A6, a check is made whether reactive power-production is currently demanded, for example, by the converter system controller. If there is such a reactive-power demand, the grid-side inverters of the converter system (hence of the first converter-string and the second converter-string) are not disabled, but kept online in activity A7. In activity A8, the active power-output of the second converter-string is correspondingly reduced as described in conjunction with activity A13.

If there is no reactive power demand, the grid-side inverter of the first converter-string is also disabled in order to operate the other (not-disabled) grid-side inverter of the first converter-string close to an optimal working point.

Figure 9:
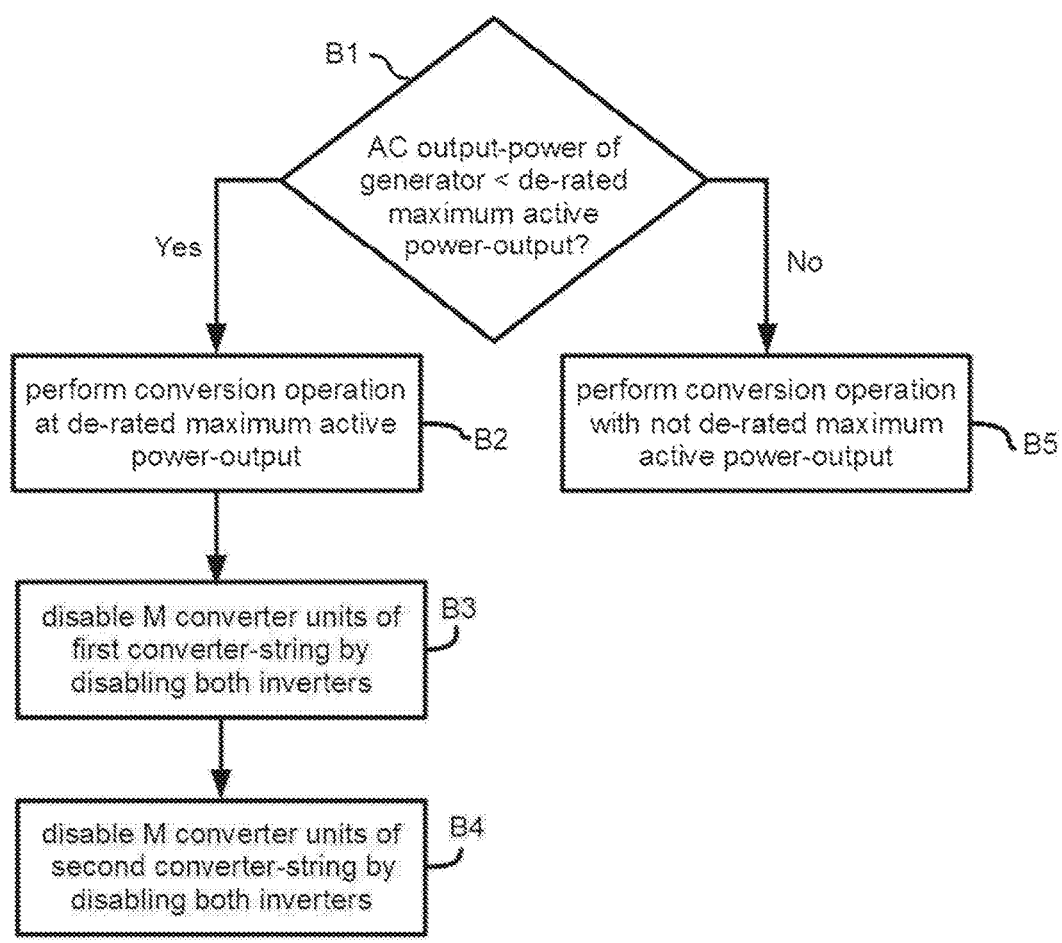
FIG. 9 is a schematic block diagram of performing power conversion with the de-rated maximum active power-output in response to an AC-power input to the converter-system that is lower than the de-rated maximum active power-output.

A block diagram of the method of operating a wind turbine when performing conversion operation with de-rated maximum active power-output in response to an AC-power output of the generator that is lower than the de-rated maximum active power-output, is shown in FIG. 9.

As mentioned above, the conversion-operation close to the working point of the generator-side and grid-side inverters can be performed, for example, when the output power of the generator is low due to low speed conditions.

The AC output-power of the generator is compared with the de-rated maximum active power-output of the wind turbine in activity B 1. In the example of the converter-system of FIG. 2, equipped with four equal converter units (two in each converter-string)—each converter unit of a converter-string formed by one grid-side inverter and one generator-side inverter of the converter-string—the de-rated maximum active power-output corresponds to the maximum active power-output of two converter-units.

When performing conversion operation with the de-rated maximum active power output, M converter-units of the first converter-string (in the exemplary converter-system of FIG. 2 this would be one converter unit) and M converter-units with equal active power-output of the second converter-string (in the exemplary converter system of FIG. 2 this would also be one converter unit) are disabled. Thereby, the converter-system is capable of producing 50% of its maximum active power-output when performing conversion operation with the de-rated maximum active power-output.

As mentioned above conversion losses are reduced when the wind turbine is operated at the de-rated maximum active power-output, if the AC power-output of the generator is below the de-rated maximum active power output.

Although certain products constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

The invention claimed is:

1. A method of controlling a full-scale converter system for converting active power produced by a generator of a variable speed wind turbine to be supplied to an electrical grid, the converter system comprising:
    a first series connection of parallel-connected generator-side converters, each of the generator-side converters configured to convert alternating current (AC) produced by the generator to direct current (DC), and
    a second series connection of parallel-connected grid-side converters, each of the grid-side converters configured to convert DC to AC to be supplied to the electrical grid,
    wherein DC sides of the first series connection and the second series connection are connected back to back to form a common DC link,
    wherein a first converter string comprises a first generator-side converter of the first series connection and a first grid-side converter of the second series connection that are at a first voltage level,
    wherein a second converter string comprises a second generator-side converter of the first series connection and a second grid-side converter of the second series connection that are at a second voltage level,
    wherein the first series connection and the second series connection have respective voltage center points with voltage levels between the first voltage level and the second voltage level,
    wherein the respective voltage center points are coupled together by a center-line conductor,
    wherein the method comprises:
        in response to at least one of (i) the first grid-side converter and (ii) the generator-side converter of the first converter string being disabled, performing one or more of:
            disabling the second grid-side converter of the second converter string;
            disabling the second generator-side converter of the second converter string; and
            reducing an active power conversion of the second converter string,
            wherein a compensation current along the center-line conductor is prevented; and
        supplying, from the converter system to the electrical grid, an active power that is de-rated from a maximum active power output of the converter system.

2. The method of claim 1, wherein supplying the active power that is de-rated from the maximum active power output comprises, in response to receiving an AC input power from the generator that is less than the de-rated maximum active power output:
    disabling at least one of (i) the first grid-side converter and (ii) the first generator-side converter of the first converter string; and
    disabling at least one of (i) the second grid-side converter and (ii) the second generator-side converter of the second converter string.

3. The method of claim 1, wherein at least one of (i) the first grid-side converter and (ii) the first generator-side converter of the first converter string is disabled due to a fault.

4. The method of claim 1, wherein in response to a particular grid-side converter of a particular converter string being disabled, an active power production of a generator-side converter of the same converter string is disabled, and when the generator-side converter of the particular converter string is disabled, an active power production of the grid-side converter of the same converter string is disabled.

5. The method of claim 1, wherein disabling the second grid-side converter or disabling the second generator-side converter comprises not transmitting pulse-width modulation commands to the second generator-side converter or the second grid-side converter.

6. The method of claim 1, wherein the converter system comprises:
    at least one circuit breaker on AC sides of the generator-side converters, wherein the at least one circuit breaker is configured to disable the generator-side converter by disconnecting the connection between the generator-side converter and the generator; and
    at least one circuit breaker on AC sides of the grid-side converters, wherein the at least one circuit breaker is configured to disable the grid-side converter by disconnecting the connection between the grid-side converter and a transformer.

7. The method of claim 3, wherein the fault of the at least one of (i) the first generator-side converter and (ii) the first grid-side converter is detected by at least one of:
    (a) comparing at least one of (i) current measurements, (ii) voltage measurements, and (iii) power measurements taken at a power input and at a power output of the first converter string, and
    (b) measuring a temperature of the first generator-side converter or the first grid-side converter.

8. The method of claim 1, wherein reducing the active power conversion of the second converter string comprises:

setting an active power output threshold to a maximum active power output of the first converter string.

9. The method of claim 1, wherein supplying the active power that is de-rated from the maximum active power output comprises:
providing reactive power by grid-side converters unless the first grid-side converter of the first converter string is disabled due to a fault.

10. The method of claim 1, wherein the converter system comprises:
energy dissipation units configured to dissipate power that is produced by the generator above the de-rated maximum active power output,
wherein supplying the active power that is de-rated from the maximum active power output is in response to a fault of at least one of (i) the first generator-side converter or (ii) the first grid-side converter of the first converter string.

11. The method of claim 10, wherein the energy dissipation units are located in the common DC link.

12. The method of claim 1, wherein the first generator-side converter of the first converter string and the second generator-side converters of the second converter string are supplied with variable frequency AC current from the generator by respective first generator windings and second generator windings, and
wherein the first grid-side converter of the first converter string and the second grid-side converter of the second converter string supply fixed frequency AC current through respective first transformer windings and second transformer windings to the electrical grid.

13. The method of claim 1, wherein the first generator-side converter and the second generator-side converter are located in a nacelle of the wind turbine,
wherein the first grid-side converter and the second grid-side converter are located in a base of a tower of the wind turbine, and
wherein the center-line conductor, a positive potential conductor, and a negative potential conductor extend along the tower from the nacelle to the base of the tower.

14. A full-scale converter system for converting active power produced by a generator of a variable speed wind turbine to be supplied to an electrical grid, the converter system comprising:
a first series connection of parallel-connected generator-side converters, each of the generator-side converters configured to convert alternating current (AC) produced by the generator to direct current (DC);
a second series connection of parallel-connected grid-side converters, each of the grid-side converters configured to convert DC to AC to be supplied to the electrical grid,
wherein DC sides of the first series connection and the second series connection are connected back to back to form a common DC link,
wherein a first converter string comprises a first generator-side converter of the first series connection and a first grid-side converter of the second that are at a first voltage level,
wherein a second converter string comprises a second generator-side converter of the first series connection and a second grid-side converter of the second series connection that are at a second voltage level,
wherein the first series connection and the second series connection have respective voltage center points with voltage levels between the first voltage level and the second voltage level, and
wherein the respective voltage center points are coupled together by a center-line conductor; and
a converter control system programmed to:
in response to at least one of (i) the first grid-side converter and (ii) the generator-side converter of the first converter string being disabled, perform one or more of:
disabling the second grid-side converter of the second converter string;
disabling the second generator-side converter of the second converter string; and
reducing an active power conversion of the second converter string,
wherein a compensation current along the center-line conductor is prevented; and
supply, from the converter system to the electrical grid, an active power that is de-rated from a maximum active power output of the converter system.

15. The converter system of claim 14, wherein the converter control system is further programmed to supply the active power that is de-rated from the maximum active power output by:
in response to receiving an AC input power from the generator that is less than the de-rated maximum active power output:
disabling at least one of (i) the first grid-side converter and (ii) the first generator-side converter of the first converter string; and
disabling at least one of (i) the second grid-side converter and (ii) the second generator-side converter of the second converter string.

16. A wind turbine comprising:
a generator configured to generate a variable-frequency alternating current (AC) active power;
a full-scale converter system configured to convert the active power from the generator for delivery to an electrical grid, the converter system comprising a plurality of converter strings arranged in parallel, wherein each converter string of the plurality of converter strings respectively comprises:
a first parallel arrangement of generator-side converters; and
a second parallel arrangement of grid-side converters,
wherein the first parallel arrangement and the second arrangement are coupled using a plurality of conductors,
wherein the first parallel arrangements of the plurality of converter strings are arranged in series, and
wherein the second parallel arrangements of the plurality of converter strings are arranged in series; and
a control system configured to:
responsive to detecting that one or both of (i) a first grid-side converter and (ii) a first generator-side converter of a first converter string of the plurality of converter strings is disabled, perform one or more of:
disabling a second grid-side converter of a second converter string of the plurality of converter strings;
disabling a second generator-side converter of the second converter string; and
reducing an active power conversion of the second converter string, and control the converter system to supply an active power that is de-rated from a maximum active power output of the converter system.

17. The wind turbine of claim 16,
wherein for the first converter string, the first parallel arrangement and the second arrangement are coupled using a center-line conductor and a first conductor of the plurality of conductors, wherein the first conductor is at a first potential, and
wherein for the second converter string, the first parallel arrangement and the second arrangement are coupled using the center-line conductor and a second conductor of the plurality of conductors, wherein the second conductor is at a second potential.

18. The wind turbine of claim 17, wherein the first potential is one of a positive potential and a negative potential, and wherein the second potential is the other of the positive potential and the negative potential.

19. The wind turbine of claim 17, wherein a compensation current along the center-line conductor is prevented.

20. The wind turbine of claim 16, wherein the control system is further configured to:
responsive to detecting that one of (i) the first grid-side converter and (ii) the first generator-side converter of the first converter string is disabled, disable the other of (i) the first grid-side converter and (ii) the first generator-side converter.

* * * * *